United States Patent [19]

Waldrum

[11] 3,931,930

[45] Jan. 13, 1976

[54] VARIABLE SPRAY APPARATUS AND METHOD

[75] Inventor: John E. Waldrum, Ambler, Pa.

[73] Assignee: Amchem Products, Inc., Ambler, Pa.

[22] Filed: Mar. 6, 1975

[21] Appl. No.: 555,909

[52] U.S. Cl. .................. 239/7; 239/253; 239/256; 239/587; 239/DIG. 1; 169/43
[51] Int. Cl.² ..... B05B 1/02; B05B 3/06; B05B 1/34
[58] Field of Search ........ 169/62, 24, 53, 43; 239/7, 239/11, 225, 251, 253, 256, 261, 587, 258, DIG. 1, 227

[56] References Cited
UNITED STATES PATENTS

| | | | |
|---|---|---|---|
| 1,299,380 | 4/1919 | Plumer | 239/256 X |
| 1,390,310 | 9/1921 | Plumer | 239/258 X |
| 2,683,626 | 7/1954 | Wahlin | 239/587 X |
| 2,751,251 | 6/1956 | Sak et al. | 239/258 |
| 3,081,953 | 3/1963 | Bammann | 239/227 X |
| 3,121,536 | 2/1964 | McKibben | 239/253 |
| 3,362,643 | 1/1968 | Larson et al. | 239/587 X |

FOREIGN PATENTS OR APPLICATIONS

| | | | |
|---|---|---|---|
| 4,061 | 10/1927 | Australia | 239/DIG. 1 |
| 141,327 | 5/1951 | Australia | 239/258 |
| 1,457,818 | 5/1969 | Germany | 239/251 |
| 1,049,753 | 11/1966 | United Kingdom | 239/7 |
| 1,375,039 | 11/1974 | United Kingdom | 239/7 |

Primary Examiner—Robert S. Ward, Jr.
Attorney, Agent, or Firm—Caesar, Rivise, Bernstein & Cohen

[57] ABSTRACT

A spraying apparatus and a method for spraying a liquid in a pattern which can be adjusted without stopping the spraying operation. The apparatus comprises a pair of nozzles, each including an orifice providing a liquid stream therefrom. The nozzles are mounted on opposed radially extending arms, each arm extending a predetermined distance along an axis which is normal to the central axis of the apparatus. Means are provided for adjusting the angular orientation of the nozzles with respect to the central axis to enable each nozzle's orifice to extend at any predetermined angle within the range of parallel to the central axis up to an angle of approximately 45° with respect to the central axis. When the nozzles are oriented with their respective orifices parallel to the central axis the apparatus provides a pair of liquid streams in a relatively straight line which is parallel to the axis. When the nozzles are adjusted to some other angle, the liquid streams from the nozzles create a reaction force on the nozzle having a component in a direction tangential to the radially extending axis to effect the rotation of the nozzles about the central axis. This action creates a helical spray pattern about the central axis, with the diameter of the spray pattern created being a function of the angular orientation of the nozzles.

27 Claims, 8 Drawing Figures

VARIABLE SPRAY APPARATUS AND METHOD

This invention relates generally to spraying devices and more particularly to devices for providing an adjustable spray pattern suitable for agricultural application and fire fighting applications.

Various hydraulic devices for spraying agricultural liquids have been disclosed in the patent literature and some are commercially available. However, such devices suffer from various drawbacks, the most serious of which being the inability to adjust the spray pattern to accommodate different terrain.

For large scale seeding applications commercially available hydraulic spraying devices have generally taken the form of conventional straight line nozzles which are stationarily mounted and through which a combination of seed, fertilizer and mulch in a water carrier is pumped to form a stream spray pattern. While such devices are capable of higher seed application rates than conventional mechanical spreaders, such devices nevertheless leave much to be desired insofar as economy, speed of operation and eveness of seed application is concerned.

In my co-pending U.S. Pat. application Ser. No. 422,817, filed on Dec. 7, 1973 and assigned to the same assignee as this invention, there is disclosed and claimed aerial spraying means which enable the faster and more even application of seed than was possible theretofore. To that end, the device disclosed therein is particularly adapted to be carried in the air at a relatively high rate of speed over the ground to be seeded. The device basically comprises an input chamber into which a suspension of seed and a carrier fluid is pumped. A plurality of nozzles are provided in communication with the chamber and each nozzle extends generally radially outward from the central axis of the device while also generally downward at an acute angle to said axis. The device is arranged to be rotated rapidly by a motor to create centripetal force, which effects the spraying of the suspension into the air in a relatively evenly distributed pattern.

While such a device has shown itself to be of significant utility for the application for which it is intended, that is, aerial seeding applications, aerial seeding techniques may not be feasible or suitable for some farming applications. Accordingly, the need presently exists for spraying apparatus for land based use and which overcomes the disadvantages of the prior art.

In British Pat. No. 1,375,039, there is disclosed and claimed land based spraying apparatus for spraying trees with a liquid. The apparatus comprises a plurality of rotating spray heads mounted on a frame for producing helical spray patterns. While the British Patent discloses that the angular orientation of the nozzles may be adjusted to adjust the direction of the spray and the speed of rotation, no means are disclosed for effecting such adjustment. Accordingly, in order to adjust the spray, the spraying apparatus must be stopped, thereby resulting in unnecessary "down time" during which the spraying can not occur. Such action may substantially slow down the spraying operation, particularly in agricultural applications wherein the terrain being traversed varies substantially, which variance necessitates different angular orientations of the spray nozzles so the spray can accommodate the different terrain features.

Accordingly, it is a general object of this invention to provide a spraying method and apparatus which overcomes various disadvantages of the prior act.

It is a further object of this invention to provide a spraying method and apparatus for producing a liquid stream in a spray pattern, which pattern can be readily adjusted during the spraying operation and without stopping the liquid stream.

It is still a further object of this invention to provide a simple, quick acting and efficient spraying apparatus for readily adjusting the spray pattern from a substantial straight line path to a relatively wide helical path and vice versa and without necessitating the stopping of the spraying operation.

In addition to the foregoing, the instant invention also has particular utility in fire fighting applications.

As is known, in fighting fires it is of considerable importance to drive the smoke produced by the fire back to the source of the flames in addition to the primary tasks of wetting the unburned portions of the structure to prevent their combustion, while dousing the source of the flames to extinguish the fire. Conventional straight nozzles and spraying techniques used therewith, while enabling the effective application of water to the source of the flame to extinguish the fire are particularly deficient for driving the smoke produced by the fire back to the source of the flames.

Accordingly, it is another object of this invention to provide a method and apparatus which overcomes the various disadvantages of prior art fire fighting techniques and apparatus therefor.

It is yet a further object of this invention to provide a method and apparauts for producing a spray pattern which can be readily adjusted without stopping spraying for use in dousing the source of the flames, for wetting unburned portions of the structure and for trapping smoke and driving the trapped smoke back to the source of the fire.

These and other objects of this invention are achieved by providing method and apparatus for spraying a liquid in an adjustable pattern. The apparatus comprises a rotatable spray head including at least one nozzle including a orifice for providing a liquid stream therefrom. The nozzle is mounted on a radial axis extending normally to the central axis of the apparatus. Means are provided for readily adjusting the angular orientation of the nozzle with respect to the central axis and without stopping the liquid stream, to enable the nozzle's orifice to extend at any predetermined angle within the range of parallel to the central axis up to an angle of approximately 45° with respect thereto. When the nozzle is oriented with its orifice parallel to the central axis the nozzle provides a liquid stream in a relatively straight line which is parallel to the central axis. However, when the nozzle is adjusted by the adjusting means to some angle greater than 0° the liquid streaming from the nozzle creates a reaction force at the nozzle and having a component which is tangential to said radial axis to effect the rotation of the nozzle about the axis. The rotation of the nozzle about the axis creates a helical spray pattern symmetrically about the axis, with the diameter of the pattern being a function of the angular orientation of the nozzle with respect to the axis.

Other objects and many of the attendant advantages of this invention will be readily appreciated as the same becomes better understood by reference to the following detailed description when considered in connection with the accompanying drawing wherein.

Figures 1, 2:
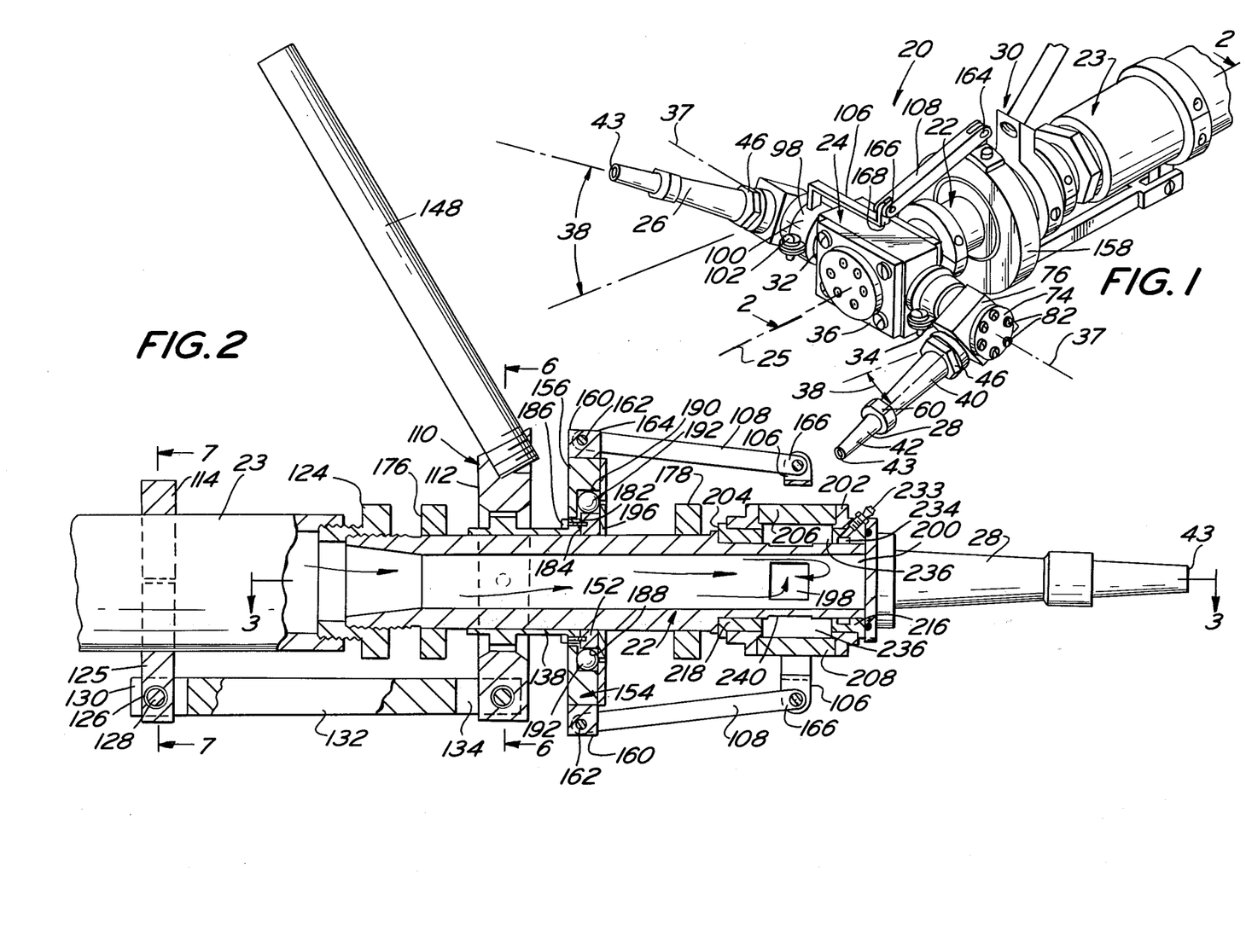
FIG. 1 is a perspective view of spraying apparatus in accordance with the instant invention.
FIG. 2 is an enlarged sectional view taken along line 2—2 of FIG. 1.

Referring now in greater detail to the various figures of the drawing, wherein like reference characters refer to like parts, there is generally shown at 20 in FIG. 1 a variable pattern hydraulic spraying device in accordance with this invention.

The device 20 basically comprises a central feed or supply tube 22 for connection to a liquid supply hose 23, a spray head 24 arranged for rotation about the central axis 25 of the supply tube and including a pair of adjustable nozzles 26 and 28, and adjustment means 30 for adjusting the angular orientation of the nozzles with respect to the central axis.

The nozzles 26 and 28 are mounted at the ends of a pair of arms 32 and 34, respectively. The arms 32 and 34 are each hollow members which project radially in opposite directions from a central housing 36 along a radial pivot axis 37. As can be seen in FIG. 1 the pivot axis entends normally to the central axis 25.

The housing 36 is a hollow member rotatably mounted on the end of the supply tube 22 and is arranged to receive liquid therefrom and to provide the liquid to the arms 32 and 34 for subsequent passage to the nozzles mounted thereon.

Each of the nozzles 26 and 28 is adjustable for orientation in a plane perpendicular to the axis 37 of the arm upon which it is mounted and through a predetermined range 38 of angles with respect to the central axis of the supply tube. In accordance with the preferred embodiment of this invention the range of angles through which each nozzle can be adjusted is shown by the angular range 38 and encompasses all angles from 0°, that is parallel to the central axis 25, to 45° with respect to the central axis, with one of the nozzles mounted for adjustment through said angular range measured in the clockwise direction about axis 37 and the other nozzle mounted for corresponding adjustment through said range measured in the counter-clockwise direction about axis 37.

As will be described in detail later, the spray head 24 and the nozzles 26 and 28 mounted thereon are arranged to rotate about the central axis of the supply tube whenever the angle of the nozzles with respect to the central axis is slightly greater than 0°. Such rotation is effected automatically and without any motor by the reaction force created as the liquid exits the angularly oriented nozzles. The actual force rotating the spray head is the tangential component of the reaction force of the exiting liquid acting on the nozzle at its radial position on axis 37 to provide the rotational force to the spray head. As will be appreciated by those skilled in the art the greater the angle that the nozzles make with respect to the central axis, the larger the tangetial reaction force component created for any given liquid flow rate. Accordingly, as the angle that the nozzles make with the central axis is increased from 0° to 45° the speed or rotation of the spray head increases.

The spray pattern created by the rotation of the spray head is in the form of a pair of interlaced rotating helical streams, one such stream from each nozzle. As indicated heretofore, in accordance with the preferred embodiment of the invention, the nozzles are arranged such that the magnitude of the angle which each makes with respect to the central axis is identical but each extends in an opposite rotational direction to the other when measured about axis 37, so that one nozzle extends upward with respect to the central axis while the other nozzle extends downward. The net effect of such a nozzle orientation is to increase the rotational force created while producing a pair or interlaced helical spray patterns, with the diameter of both helices being the same.

It should be pointed out at this juncture that while the nozzles disclosed herein are shown as being adjusted by the adjustment means 30 to the same angle with respect to the central axis but in opposite directions, it is contemplated that the nozzles may be adjustable individually or together to different angles from each other, if desired.

As should be appreciated by those skilled in the art, the diameter of the helical spray pattern produced by the rotation of the spray head 24 is also a function of the angle of the orientation of the nozzles with respect to the central axis, that is the greater the angle the nozzle makes with respect to the central axis, the greater the diameter of the helix produced thereby and vice versa. As the diameter of the spray pattern increases, the distance or range that the pattern is thrown from the device decreases. When the angle of the orientation of the nozzles is so small as to reduce the tangential reaction force component to zero, that is when the nozzles are oriented parallel to or almost parallel to the central axis, the spray head ceases rotating, whereupon the spray pattern is in the form of a pair of long range relatively straight streams of liquid.

Accordingly, the spray pattern of the instant invention can be adjusted continuously from a relatively narrow straight stream pattern having a long range, when the nozzles are parallel to the axis, to a very wide helical stream pattern having a shorter range, when the nozzles are disposed at an 45° angle with respect to the axis but in opposed directions.

The ready adjustability of the spray pattern of the invention, without requiring stoppage of the spraying operation, makes this invention particularly suitable for agricultural spraying applications wherein different spray patterns may be required during one traversal of the area being sprayed, e.g., when the terrain being traversed changes substantially. With the instant invention, by merely operating the adjustment means 30, as will be described hereinafter, one can immediately tailor the spray to the shape desired. For example, one can go from a wide swath for spraying large areas close to the apparatus to a long straight stream for spraying distant areas, virtually instantaneously by the operation of the adjustment means.

Figure 3:
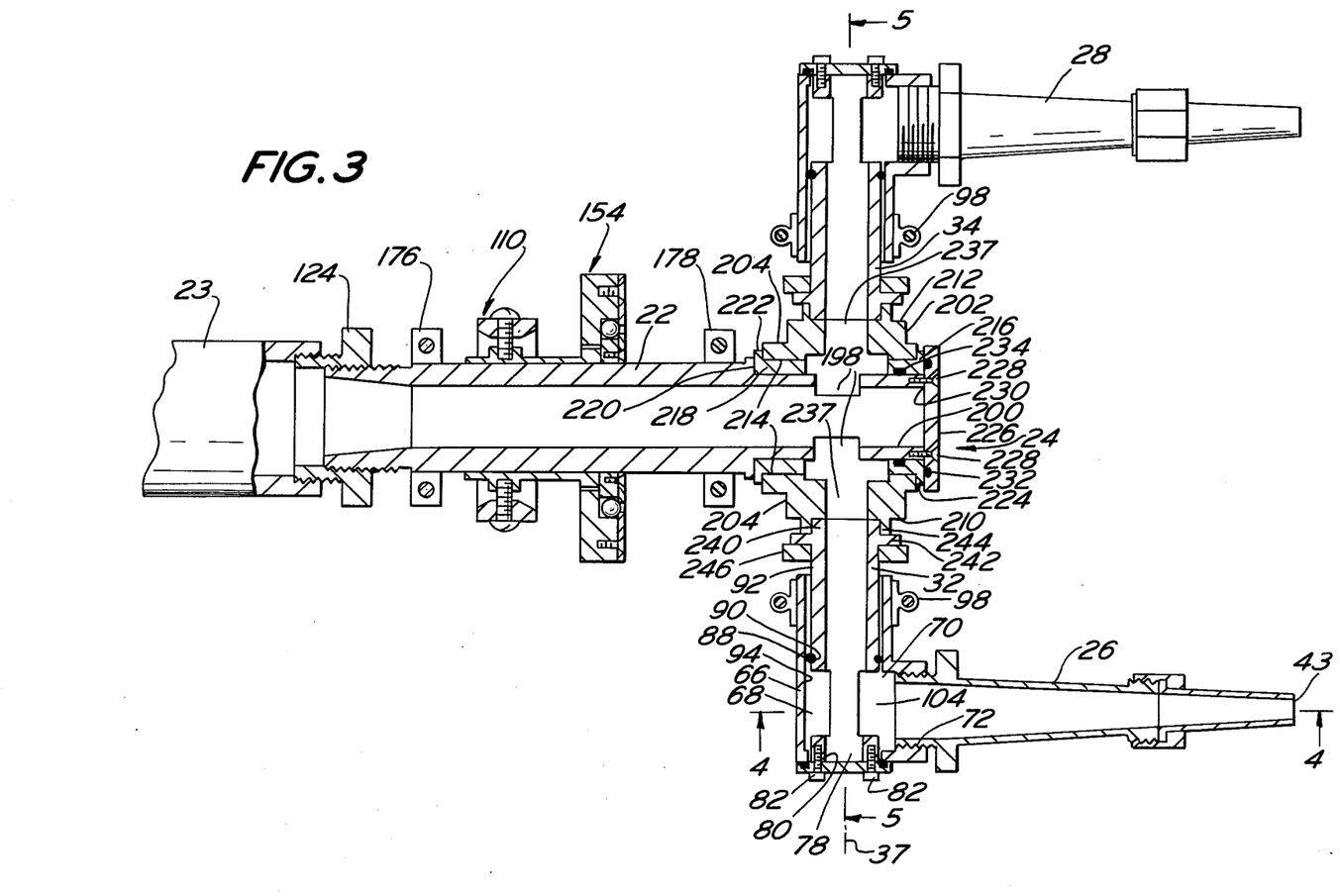
FIG. 3 is a sectional view taken along line 3—3 of FIG. 2.
Figures 4, 5:
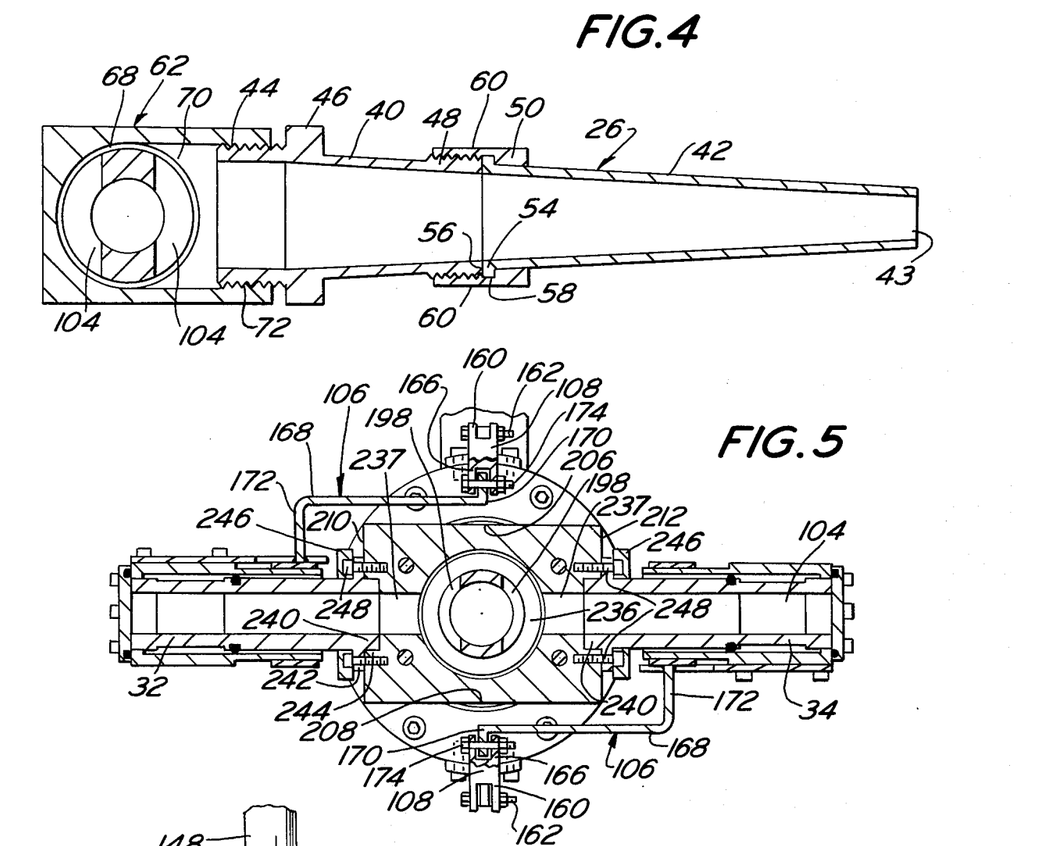
FIG. 4 is an enlarged sectional view taken along line 4—4 of FIG. 3.
FIG. 5 is a sectional view taken along line 5—5 of FIG. 3.

As can be seen in FIGS. 1, 3 and 4 the nozzles 26 and 28 are identical and each includes two portions, namely, a base portion 40 and a tip 42. The base portion 40 is a hollow tapered member including a threaded portion 44 at one end thereof. A nut-shaped flange 46 projects around the outer periphery of the base portion adjacent to the threaded end 44. The other end, 48, of the base portion 40 of the nozzle is also threaded and serves, in conjunction with a threaded sleeve 50, to secure the tip portion 42 to the base portion to form the nozzle. The tip portion 42, like the base portion 40, is a hollow tapered member and includes a locking flange 54 about the periphery of one end. The flange 54 is arranged to abut the end face 56 of the end of base portion 40 and fits within a recessed shoulder 58 within sleeve 50. The outer surface of the sleeve 50 includes a flatted portion 60 (FIG. 1) which serves as a gripping surface to enable the tightening of the sleeve in the base portion 40. As will be appreciated, when the sleeve is tightened, the shoulder 58 pulls the flange 54 into tight abutment with the end face 56, thereby firmly securing the tip portion 42 to the body portion 40 and forming a fluid tight seal therebetween.

The end of the tip portion 42 is in the form of a circular orifice 43 through which the fluid being sprayed exits the nozzle.

The threaded end portion 44 of the nozzle serves to secure the nozzle to means for supporting the nozzle at various angular orientations with respect to the radial axis 37. To that end, a respective pivotable member, hereinafter referred to as a nozzle pivot 62 is provided mounted at the end of each arm 32 and 34 to support the nozzle thereon at any angular orientation with respect to axis 37.

As can be seen in FIGS. 1, 3 and 4, each nozzle pivot 62 includes a generally box-like portion 64 having a tube-like portions 66 projecting a substantial distance therefrom. The box-like portion is a hollow member defining an interior chamber 68. The chamber 68 serves to receive liquid from the tubular arm associated therewith and is of generally cylindrical shape. The chamber also includes a projecting passageway 70 communicating with a threaded opening 72 in one side wall of the box-like portion 64. The opening 72 serves as the means for securing the nozzle in place on the nozzle pivot 62. Toward that end the threaded end portion 44 of the base portion of the nozzle is screwed into the opening 72 of the nozzle pivot and is tightened by the appplication of a twisting force to the nut-like flange 46 to form a fluid tight joint.

Each of the arms 32 and 34 is constructed in an identical manner and basically comprises a circular cylindrical body portion 74 for carrying liquid therethrough to chamber 68 and terminates in an open end 76. The body portion of each arm extends through the tube-like portion 66 of the nozzle pivot 62 associated therewith and extends into chamber 68 in the box-like portion 66 of the nozzle pivot.

As can be seen in FIGS. 1 and 3 a circular cap 78 is provided on the end wall 76 of the box-like portion 64 of the nozzle pivot 62. The cap 78 serves to seal the open end of the tubular arm and for connecting the nozzle pivot to the arm in such a manner as to enable the nozzle pivot to be adjustably pivoted about the axis 37 through any angle. To that end, the cap is abutted against the end face 80 of the open end 76 of the tubular arm and is secured in place, via plural peripherally disposed bolts 82. An O-ring 84 is disposed within an angular recess 86 in the inside face of the cap 74 and at the interface of the cap and the end face 80. The O-ring serves to seal the interface from the egress of liquid therethrough while enabling the box-like portion 64 and the tube-like portion 66 of the nozzle pivot 62 to be pivoted about axis 37 and with respect to the fixed tubular arm 32 and the cap 74 secured thereto.

A second O-ring 88 (FIG. 3) is disposed within an annular recess 90 cut in the outer peripheral surface 92 of the tubular arm 32 and at an intermediate point thereon. The O-ring 88 is tightly interposed between the recess and the inner peripheral surface 94 of the tubular portion 66 of the nozzle pivot 62. The O-ring 88 serves to provide a fluid tight seal for the system to preclude liquid in chamber 68 from exiting through the space between the outer surface of the arm and the inner surface of the tubular portion of the nozzle pivot, irrespective of the angular orientation of the latter with respect to the former.

In order to hold the nozzle pivot in the orientation desired, a clamp 98 is provided connected thereto. Once such clamp is provided for each of the nozzle pivots. As can be seen in FIG. 1 each clamp 98 is of a conventional type and comprises a split ring 100 secured about the outer periphery of the tubular portion of the nozzle pivot with which it is associated and an adjustment screw 102 for contracting the ring. Upon the tightening of the screw 102 the ring contracts, thereby compressing the tubular portion 66 contiguous therewith into contact with the underlying surface of the tubular arm. This action effectively locks the nozzle pivot in place.

In accordance with the preferred embodiment of this invention each tubular arm includes a pair of opposed openings 104. The openings are provided through the wall of the arm in the portion thereof disposed within chamber 68. The openings are extremely large and extend for a major portion of the diameter of the tube to provide substantial passageways for liquid to flow from the hollow interior of the arm into the chamber 68 for subsequent passage to the nozzle, irrespective of the angular orientation of the nozzle with respect to the arm upon which it is mounted (see FIG. 4).

The means for effecting the angular adjustment of the nozzle pivots and the nozzles supported thereon is generally shown at 30 and basically comprises a pair of nozzle pivot arms 106, one for each nozzle pivot, a pair of nozzle linkage arms 108, one for each nozzle pivot arm 106, and a manually operable slide assembly 110. The slide assembly, as can be seen in FIG. 2, comprises a pair of slide rings 112 and 114. The ring 112 is denoted as the forward slide ring and the ring 114 is denoted as the rear slide ring. The rear slide ring 114 is in the form of a split ring having a pair of curved sections 116 and 118 (see FIG. 7) which are secured together, via counter-sunk bolts 120. The rear ring is disposed about the periphery of the liquid supply hose 23, which is connected, via a threaded communicating coupling 124, to one end of the main feed tube 22. The ring 114 is arranged to be slid along the supply tube 122 to act as a guide for the slide assembly, as will be described hereinafter. To that end, the bolts are tightened only sufficiently to close the ring such that it closely encircles the tube 122 but not so tightly as to substantially impede the slidability of the ring along the tube.

Figure 7:
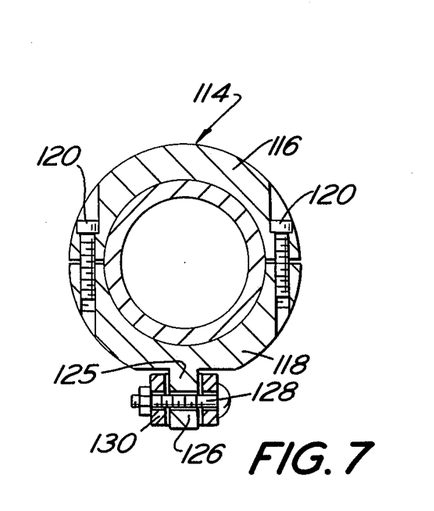
FIG. 7 is a sectional view taken along line 7—7 of FIG. 2.

As can be seen in FIG. 7, the ring 114 also includes a downwardly extending projection 125 having an opening 126 through which a bolt 128 extends. The bolt 128 serves to secure a bifurcated end 130 of a linkage arm 132 to the ring 114. The linkage arm 132 is an elongated member whose other end 134 is also bifurcated and is connected, via a similar bolt 128, to a projection 136 of the forward ring 112.

Figure 6:
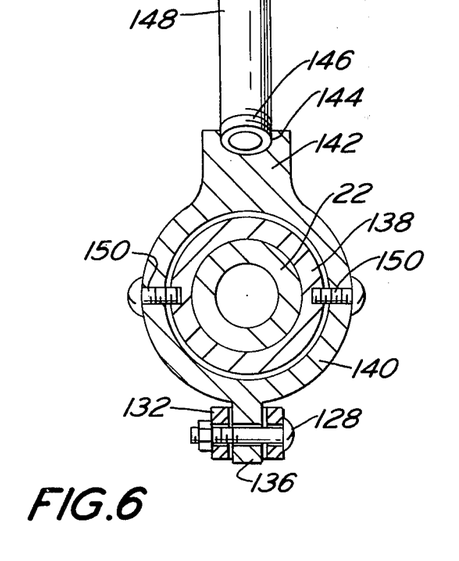
FIG. 6 is a sectional view taken along line 6—6 of FIG. 2.

As can be seen in FIG. 6, the forward ring comprises a pair of concentric members. The inner member is in the form of a sleeve 138 which encircles the main supply tube 22 and is arranged to be slid therealong, as will be described in detail. The outer member of the concentric members is in the form of a ring 140 which in turn encircles the sleeve 138. The outer ring 140 includes the heretofore described projection 136 and also includes an upward extension 142 including a threaded opening 144 into which a threaded end 146 of a handle bar 148 is screwed. The sleeve 138 is secured to the encircling ring 140, via a pair of bolts 150 extending through aligned holes in the ring and sleeve.

The forward end of the sleeve 138 is connected to an axially slidable but non-rotatable ring portion 152 of a bearing assembly 154. The assembly 154 also includes a bearing ring 156 which is axially slidable along the supply tube with sleeve 138 and is rotatable about the ring 156 to enable the adjustment of the angular orientation of the nozzles as the spray head 24 rotates.

The details of the bearing assembly 154 will be considered in detail hereinafter, suffice to say at this point that the ring 156 of the assembly is arranged to be slid along the axis of the supply tube as it rotates about the supply tube.

As can be seen in FIG. 2, a pair of projections 160 are secured to diametrically opposed peripheral portions of the ring 156. The projections 160 serve as means for connecting the respective linkage arms 108 to the ring 156. To that end, a separate bolt 162 is disposed within respective openings in the projections 160 and within the aligned respective openings in a bifurcated end 164 of each arm 108. The other end 166 of each arm 108 is also bifurcated.

The arms 106 are arranged to translate the linear motion of the ring along the supply tube 22 into rotational motion for pivoting the nozzle pivots with respect to the axis 37 a corresponding amount to adjust the angular orientation of the nozzles to the desired settling. To that end, as can be seen in FIG. 5, each nozzle pivot arm 106 is an angled member having an elongated main portion 168 extending parallel to axis 37 and terminating in a pair of opposed normally extending flanges 170 and 172. The shorter one of the opposed flanges, namely, 170, of each nozzle pivot arm is connected, via a bolt 174, to the other bifurcated end 166 of a respective one of the linkage arms 108. The longer flange, 172, of each nozzle pivot arm is fixedly secured, as by welding, to the ring 100 of a respective one of the clamps 96.

As can be seen in FIG. 2, a pair of stop rings 176 and 178 are mounted on the central supply tube 22 with the bearing assembly 154 and the forward ring 112 interposed therebetween. The rings 176 and 178 are fixed in position and serve as stops for limiting the sliding travel of the adjusting means in either direction along the tube 22.

Operation of the adjusting means 30 is as follows: by merely grasping the handle bar 148 and either pushing it forward or pulling it rearward, the linear translational force applied to the outer ring 110, via the handle bar, is coupled, via bolts 150, to the sleeve 138 to effect the sliding of the sleeve along the main feed tube 22 in the direction of the applied force, with the stop rings 176 and 178 limiting the travel. The rear ring 114 serves to guide the linear translational motion of the sleeve, via the linkage bar 132 connected between the rear ring 114 and the forward ring 110.

The sliding of the sleeve 138 results in the concomitant motion of the ring portion 156 of the bearing assembly 154. The forward movement of ring 156 is coupled through the linkage arms 108 to the nozzle pivot arms associated therewith. The linear motion of the linkage arms is translated by the respective pivot arms into rotational motion about the axis 37, whereupon when the linkage arms move forward each nozzle pivot rotates towards the central axis 25 such that the angle that each nozzle makes with the central axis is decreased. Conversely, when one pulls back on the handle bar 148, the backward motion of the linkage arms is translated into rotational motion to cause the nozzle pivots to rotate away from the central axis, whereupon the angle that each nozzle makes with the central axis is increased.

As noted heretofore, the bearing assembly 154 serves as the means for enabling the nozzles to be pivoted about the radial axis 37 to the desired angular orientation with respect to the central axis 25 as the spray head 24 rotates about the central axis. To that end, the bearing assembly 154 is connected between the reciprocable sleeve 138 and the linkage arms 108 and couples the linear translational motion from the former to the latter and to the pivot arms 106 connected to the linkage arms as the spray head rotates so that the linear motion of the sleeve is converted to a pivoting motion of the nozzles about the radial axis 37.

As can be seen in FIG. 2, the ring 152 is disposed about the supply tube 22 and has a side face 182 which abuts the front face 184 of the slidable sleeve 138. The ring 152 is secured to the sleeve, via plural bolts 186, extending through aligned holes in the side face of the ring and the front face of the bolt. Accordingly, the ring 152 is moved linearly along the feed tube 22 whenever the sleeve 138 is moved therealong under the force provided by the user on the handle bar 148.

The outer periphery of the ring 154 defines a race 188. As can be seen, the bearing ring 156 is disposed concentrically about the ring 152 and includes an inner peripheral race 190. The space between the races 188 and 190 is annular in shape and serves to form a track in which a plurality of ball bearings 192 are disposed. A pair of spaced, concentric annular plates 194 and 196 are connected to the front faces of the rings 156 and 152, respectively, and serve to hold the ball bearings 192 in place in the annular track. Accordingly, the ring 156 and the linkage arms 108 connected thereto are enabled to rotate about the central axis 25 of the device 20 at the same time that the sleeve 138 moves the ring 152 along the central supply tube.

As can be seen in FIG. 2, the liquid passing through the central supply tube (shown diagrammatically by the arrows in FIG. 2) flows through a pair of opposed openings 198 in the supply tube adjacent its end 200. The end portion of the supply tube including the openings 198 is disposed within the central housing 36. The central housing is a hollow structure which supports the tubular arms 32 and 34 radially outward along axis 37 while providing liquid from the central supply tube to the arms, irrespective of whether or not the spray head is rotating.

The housing 36 is of basically rectangular shape and includes a front wall 202 (FIG. 1), a rear wall 204 (FIG. 2), a top wall 206 (FIGS. 2 and 5), a bottom wall 208 (FIGS. 2 and 5) and a pair of opposed side walls 210 and 212 (FIGS. 3 and 5). The central opening 214 extends through the housing 36 from rear to front thereof and along the central axis 25. A pair of sleeve bearings 216 and 218 are mounted within the opening 214, with the bearing 216 being mounted adjacent the rear wall 204 of the housing 36 and the bearing 218 being mounted spaced from the bearing 216 and adjacent to the front wall 202 of the housing. As can be seen in FIG. 3, the central openings in the bearings are aligned and form a passageway through which the end portion 200 of the supply tube 22 passes. The end portion 200 of the supply tube is of a reduced wall thickness to provide a shoulder 220 against which the sleeve bearing 218 abuts. The sleeve bearing 218 includes a peripheral flange 222 which is interposed between the shoulder 220 and the rear wall 204 of the housing 36 to hold the bearing in place longitudinally on the supply tube. The other bearing 216 also includes a peripheral flange 224 which is interposed between the front wall 202 of the housing and a circular plate 226.

The plate 226 serves to seal the open end of the supply tube 22 from the egress of liquid therefrom as the spray head 24 rotates about the central axis 25. To that end, the plate 226 is connected, via plural bolts 228, to the open end 230 of the supply tube 22. An O-ring 232 is disposed within a circular groove on the inside face of the plate 226 and is tightly interposed between the groove and forward edge of the sleeve bearing 216 to form a water tight seal.

As should be appreciated from the foregoing, the bearings 216 and 218 serve as the means for enabling the housing 36 to rotate freely about the stationary supply tube 22.

In accordance with the preferred embodiment of this invention, the sleeve bearings are lubricated. To that end, a grease port 233 (FIG. 2) is provided through wall 202 and in communication with an annular grease receiving recess 234 in the bearing 218. This construction enables the ready lubrication of the bearings.

As can be seen in FIGS. 2 and 3, the space between the bearings 216 and 218 forms an annular chamber 236 immediately adjacent to the openings 198 in the supply tube. To further increase the size of the chamber a wide groove 240 is cut in the periphery of the tube 22 contiguous the openings 198. The chamber 236 serves to receive the liquid from the supply tube 22 through the openings 198, irrespective of the rotational position of the housing 36 with respect to the supply tube and to provide the liquid, via opposed passageways 237 (FIG. 5), to the hollow interior of the respective tubular arms 32 and 34.

The arms 32 and 34 are mounted on the side faces 210 and 212, respectively, of the central housing 36 and in communication with the fluid passageways 237 therein. Each arm is mounted in an identical manner as the other and thus only the mounting of arm 32 will be considered hereinafter.

As can be seen in FIG. 5, the rear end 240 of tubular arm 32 includes a peripheral mounting flange 242. The end 240 of the tubular arm is disposed within a complimentary opening 244 in the side wall 210 of the housing 36, with the flange abutting the side wall. A mounting plate 246 is disposed on the opposite side of the flange as the side wall so as to sandwich the flange between it and the side wall. A plurality of countersunk bolts 248 extend through aligned holes in the mounting plate and flange and are secured in aligned threaded holes in the side wall to secure the tubular arm in place.

Operation of the spray device 20 is as follows: the liquid to be sprayed is pumped by means (not shown) through the supply hose 23 and into the main supply tube 22 of the device 20. The liquid flows down the supply tube 22 towards its end 200 in the direction of the arrows shown in FIG. 2. The liquid flows out through the enlarged openings 198 in the supply tube and into the annular chamber 236 contiguous therewith. From the chamber the liquid flows into the communicating passageways 237 for subsequent flow into the interior of the respective communicating tubular arms 32 and 34 of the spray head 24. The liquid flows down each arm and out through the enlarged openings 104 therein and into the contiguous chamber 68 of the nozzle pivot 62 associated therewith. The liquid entering the chamber 68 flows into the passageway 70 and from there through threaded opening 72 into the associated nozzle. The liquid flows down the nozzle and is constricted by the tapered interior passageway thereof and exits in a relatively narrow stream from the orifice 43 at the end of the nozzle.

Assuming that the nozzles are oriented such that they extend parallel to the central axis 25, the liquid flowing out of each nozzle does not create any reaction force component on the nozzle in a tangential direction with respect to the radial axis 37. Accordingly, the spray head remains stationary and the spray pattern created thereby is in the form of a pair of relatively straight streams extending a long range parallel to the central axis, with one stream emanating from each nozzle.

If the nozzles are oriented such that each extends at an acute angle with respect to the central axis, with one nozzle pointing upward and one nozzle pointing downward with respect thereto, the liquid exiting each nozzles creates a reaction force on the nozzle having a substantial component tangential to the axis 37. The tangential force component acting on each nozzle results in the commencement of the rotation of the spray head 24 about the central axis 25, whereupon a helical spray pattern, like that discussed previously, is created. The width of the swath of the helicalspray pattern is a function of the angle with which the nozzles make with the central axis. To increase the swath width, the angle of the nozzles with respect to the central axis is increased. Conversely, to decrease the width of the swath the angle that the nozzles make with the central axis is decreased.

Insofar as increasing the swath width is concerned, operation of the device is as follows: one grasps the handle bar 148 and pulls it rearward, i.e., away from the spray head 24, a desired distance, whereupon the ring 112 and the sleeve 138 connected thereto slide linearly along the central feed tube 22 in the rearward direction a corresponding distance. The rearward movement of the sleeve is coupled, via the connected bearing assembly 154 and the connected linkage arms 108, to the nozzle pivot arms 106 of the spray head 24, whereupon the arms 106 effect the pivoting of the nozzle pivots 62 about the axis 37 and in respective directions away from the central axis 25, thereby increasing the angle that each nozzle makes with the central axis.

The decreasing of the width of the swath is effected by pushing the handle bar forward, i.e., towards the spray head 24, a desired distance, whereupon the ring 112 and the sleeve connected thereto slides linearly along the central feed tube in the forward direction a corresponding distance. The forward movement of the sleeve is coupled, via the connected bearing assembly 154 and the linkage arms 108 connected thereto, to the nozzle pivot arms 106 of the spray head 24, whereupon the arms 106 effect the pivoting of the nozzle pivots about the axis 37 and in respective directions towards the central axis 25, thereby decreasing the angle that each nozzle makes with the central axis.

As should be appreciated by those skilled in the art, the ready adjustability of the spray pattern of the instant device enables one to make the most efficient use of the material being sprayed by enabling one to instantly shape the spray pattern to accommodate changes in terrain or in the area being sprayed and without necessitating the wasteful and time consuming stoppage of the spraying operation. This is particularly significant in spraying applications wherein the spraying apparatus is mounted on moving means for carrying it at a relatively high speed adjacent to the area being sprayed.

Figure 8:
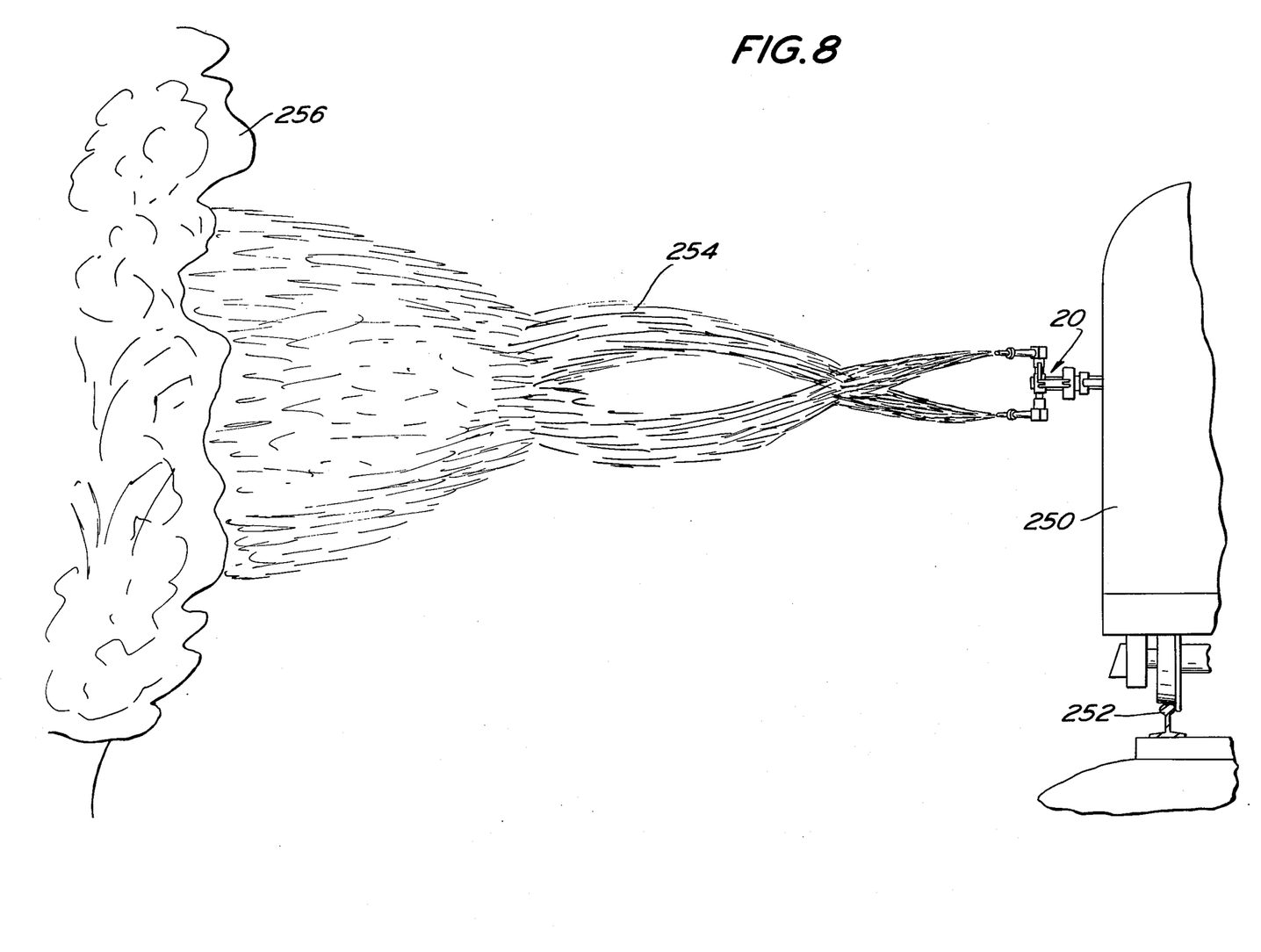
FIG. 8 is a side elevational view of the operation of the device of the instant invention producing a helical spray pattern in an agricultural spraying application.

In FIG. 8 there is shown one typical agricultural application for the spray device 20 of this invention. As can be seen therein, the device 20 is mounted on a railroad car 250 moving down tracks 252. The device is operative for producing a helical spray pattern 254 of a liquid to spray a target area, such as trees 256, located adjacent to the right-of-way as the railroad car moves along the target area.

In the event that the tree line recedes away from the tracks, the device 20 can be instantly adjusted, as described heretofore, to reduce the angle that the nozzles make with the central axis, thereby reducing the width of the stream and increasing its range, to effectively spray the remote trees. Conversely, the device can be adjusted to increase the spray pattern width while decreasing its range to spray trees which are closer to the tracks.

As noted heretofore, the ready adjustability of the spray pattern of this invention enables it to be used in fire fighting applications to extinguish the fire and control the smoke in an extremely efficient and safe manner. For example, assuming that one is confronted with a fire at the end of a long corridor of a building, good fire fighting practice requires that water be directed to the source of the fire to extinguish it and to adjacent unburned areas of the corridor to prevent combustion thereof, while producing a screen to protect the fireman from the smoke and driving smoke back down the corridor toward the source of the flame. Heretofore, conventional fire spraying equipment and techniques, while enabling the efficient wetting of the fire source, proved less efficient in quickly wetting large unburned adjacent areas and considerably inefficient in smoke driving since the liquid streams produced by such prior art devices are relatively narrow and non-adjustable.

With the instant invention one can stand at the end of the hallway and adjust the spray pattern to a narrow helix or a straight stream to reach all the way down the corridor to the source of the flame to extinguish it. For smoke driving applications the operator of the device merely pulls back on the handle to increase the angle that the nozzles make with the central axis to thereby provide an extremely wide width spray pattern. The wide width spray pattern creates a water screen immediately in front of the operator. This action effectively fills the entire width of the hall in front of the operator to trap the smoke behind the water screen. In addition, the wide swath spray effectively drenches the large unburned areas of the corridor adjacent to the operator to prevent the combustion of such areas. With the smoke effectively trapped behind the liquid screen, the operator merely pushes forward on the handle bar to reduce the size of the helical spray pattern and to direct it further down the hall. As the diameter of helix decreases, the helix traps the smoke in its spinning pattern and carries the trapped gas like a feed screw down the corridor and back to the source of the flames. If any smoke escapes, the operator merely pulls back on the handle bar to recreate the wide swath screen and to retrap the escaped smoke, after which the handle bar is pushed forward again to carry the smoke in the rotating helix back to the source of the flame. The operator of the device, by utilizing the aforedescribed device and method, can progressively move down the corridor until he is closely adjacent to the source of the flame to complete the extinguishment of the flame.

It should be pointed out at this juncture, that while the device 20 of the instant invention and its method of use is of particular utility in fire fighting applications as well as agricultural applications involving the spraying of various liquid materials, such as agricultural seeds in an entraining liquid, fertilizers, herbicides, pesticides, growth regulators, etc. or combinations thereof, the device 20 can be utilized in non-agricultural, non-fire fighting applications as well. In addition, the device 20 can be used with either stationary or mobile supporting equipment, such as automobiles, aircraft, watercraft, etc.

Without further elaboration, the foregoing will so fully illustrate my invention, that others may, by applying current or future knowledge, readily adapt the same for use under various conditions of service.

What is claimed as the invention is:

1. Apparatus for spraying a liquid in an adjustable pattern comprising a spray head rotatable about a central axis and having at least one nozzle including an orifice for providing a liquid stream therefrom, said nozzle being mounted on a radial axis extending normally from said central axis and means for readily adjusting the angular orientation of said nozzle with respect to said central axis, without stopping the liquid stream to enable the nozzle's orifice to extend at any predetermined angle within the range of parallel to the central axis up to an angle of approximately 45° with respect thereto, whereupon when said nozzle is adjusted by said adjustment means to the orientation wherein its orifice is parallel to said central axis the apparatus provides a liquid stream in a relatively straight line parallel to said central axis and when said nozzle is adjusted by said adjustment means to the orientation wherein its orifice is at some other angle with respect to said central axis the liquid stream from said nozzle creates a reaction force having a component at said nozzle which is tangential to said radial axis to effect the rotation of the nozzle about said axis, thereby creating a helical spray pattern about the axis, with the diameter of said pattern being a function of the angular orientation of said nozzle.

2. The apparatus of claim 1 wherein at least two nozzles are provided.

3. The apparatus of claim 2 wherein said laterally extending arms are disposed generally opposite to one another and wherein one of said nozzles is adjustable from 0° to 45° clockwise and the other nozzle is adjustable from 0° to 45° counter-clockwise.

4. The apparatus of claim 3 wherein said adjusting means effects the adjustment of said nozzles simultaneously.

5. The apparatus of claim 4 wherein said apparatus is mounted upon means for traversing an area to be sprayed.

6. A method of varying the size and shape of a spray pattern produced from apparatus including a central axis and a nozzle having an orifice, comprising producing a liquid stream from said orifice, adjusting the angular orientation of the orifice with respect to the axis of the apparatus and within the range of parallel to the axis up to an angle of approximately 45° with respect to said axis without stopping the liquid stream to produce either a straight stream pattern or a helical spray stream pattern, depending upon the angular orientation of said nozzle, with the width of said pattern being a function of the angular orientation of said nozzle.

7. The method of claim 6 wherein when said nozzle is adjusted to some angle other than 0° with respect to said axis the nozzle commences rotation about said axis to create a helical spray pattern.

8. The method of claim 7 wherein at least two opposed nozzles are utilized.

9. The method of claim 8 wherein one of said nozzles is adjusted within the range of 0° to 45° measured clockwise and the opposed nozzle is adjusted within the range of 0° to 45° measured counter-clockwise.

10. The method of claim 9 wherein the magnitude of the angle with which the respective nozzles make with the central axis is the same.

11. The method of varying the size and shape of an agricultural spray pattern produced by apparatus including a central axis and a nozzle having an orifice, comprising producing a liquid stream from said orifice, adjusting the angular orientation of the orifice with respect to the axis of the apparatus and within the range of parallel to the axis up to an angle of approximately 45° with respect to said axis without stopping the liquid stream to produce either a straight stream pattern or a helical spray pattern, depending upon the angular orientation of the orifice, with the width of the pattern being a function of the angular orientation of the orifice.

12. The method of claim 11 wherein when the orifice is adjusted to some angle other than 0° with respect to said axis the nozzle commences rotation about the axis to create a helical spray pattern.

13. The method of claim 12 wherein at least two opposed nozzles are utilized.

14. The method of claim 13 wherein one of said orifices is adjusted within the range of 0° to 45° measured clockwise and the opposed orifice is adjusted within the range of 0° to 45° measured counter-clockwise.

15. The method of claim 14 wherein the magnitude of the angle that the respective orifices make with said axis is the same.

16. The method of claim 11 wherein said agricultural spray comprises a liquid carrier having agricultural seeds disposed therein.

17. The method of claim 16 wherein said apparatus is moved across an area to be sprayed.

18. The method of claim 17 wherein the angular orientation of the orifice is adjusted in accordance with the terrain being traversed.

19. The method of claim 18 wherein when the orifice is adjusted to some angle other than 0° with respect to said axis the nozzle commences rotation about the axis to create a helical spray pattern.

20. The method of claim 13 wherein at least two opposed nozzles are utilized.

21. The method of claim 20 wherein one of said orifices is adjusted within the range of 0° to 45° measured clockwise and the opposed orifice is adjusted within the range of 0° to 45° measured counter-clockwise.

22. The method of claim 21 wherein the magnitude of the angle with which the respective orifices make with said axis is the same.

23. The method of producing an adjustable pattern liquid spray for use in fire-fighting applications with apparatus including a longitudinal axis and an adjustable nozzle having an orifice therein, comprising producing a liquid stream from said orifice, adjusting the angular orientation of the orifice with respect to the axis of the apparatus and within the range of parallel to the axis up to an angle of approximately 45° with respect to said axis without stopping the liquid stream to produce either a straight stream spray pattern or narrow width to wide width helical spray patterns, depending upon the angular orientation of said orifice, with the width of said pattern being a function of the angular orientation of the orifice, said spray being effective when in a wide helical pattern to provide a liquid screen effective for trapping smoke produced by the fire and when in a narrow helical pattern being effective for carrying trapped smoke back to the source of the fire.

24. The method of claim 23 wherein when the orifice is adjusted to some angle other than 0° with respect to the axis the nozzle commences rotation about the axis to create said helical spray pattern.

25. The method of claim 24 wherein at least two opposed nozzles are utilized.

26. The method of claim 25 wherein one of said orifices is adjusted within the range of 0° to 45° measured clockwise and the opposed orifice is adjusted within the range of 0° to 45° measured counter-clockwise.

27. The method of claim 26 wherein the magnitude of the angle with which the respective orifices make with said longitudinal axis is the same.

* * * * *